United States Patent
Min et al.

(10) Patent No.: US 10,665,874 B2
(45) Date of Patent: May 26, 2020

(54) COOLING SYSTEM INCLUDING BYPASS FOR ELECTRIC COMPONENT FOR FUEL CELL VEHICLE AND CONTROL METHOD FOR SAME

(71) Applicants: HYUNDAI MOTOR COMPANY, Seoul (KR); KIA MOTORS CORPORATION, Seoul (KR)

(72) Inventors: Boung Ho Min, Yongin-si (KR); Dong Hun Lee, Anyang-si (KR); Soon Il Jeon, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 145 days.

(21) Appl. No.: 15/807,344

(22) Filed: Nov. 8, 2017

(65) Prior Publication Data
US 2018/0316026 A1 Nov. 1, 2018

(30) Foreign Application Priority Data
Apr. 26, 2017 (KR) .......... 10-2017-0053323

(51) Int. Cl.
*H01M 8/04029* (2016.01)
*H01M 8/04746* (2016.01)
*B60L 58/33* (2019.01)

(52) U.S. Cl.
CPC ......... *H01M 8/04029* (2013.01); *B60L 58/33* (2019.02); *H01M 8/04768* (2013.01); *H01M 2250/20* (2013.01); *Y02T 90/32* (2013.01)

(58) Field of Classification Search
CPC H01M 8/04029; H01M 8/04768; B60L 58/33
USPC ........................................... 429/437
See application file for complete search history.

(56) References Cited

U.S. PATENT DOCUMENTS

| 2002/0127448 A1* | 9/2002 | Derflinger | H01M 8/04029 429/434 |
| 2010/0047645 A1* | 2/2010 | Miyauchi | F24D 11/005 429/495 |
| 2016/0036071 A1* | 2/2016 | Klewer | H01M 8/04029 244/53 R |

FOREIGN PATENT DOCUMENTS

| DE | 102015225650 A1 * | 6/2017 | .......... H01M 16/006 |
| KR | 10-1601438 B1 | 3/2016 | |
| KR | 10-1610076 B1 | 4/2016 | |

* cited by examiner

*Primary Examiner* — Sean P Cullen
(74) *Attorney, Agent, or Firm* — Morgan, Lewis & Bockius LLP

(57) ABSTRACT

A combined cooling system for a fuel cell vehicle and a control method thereof is capable of improving cooling performance and fuel efficiency by using interlocking control in various situations and by additionally adding a bypass loop and a control valve to a main line connecting a fuel cell, an electric component, a radiator, and a pump.

12 Claims, 3 Drawing Sheets

[FIG. 2]
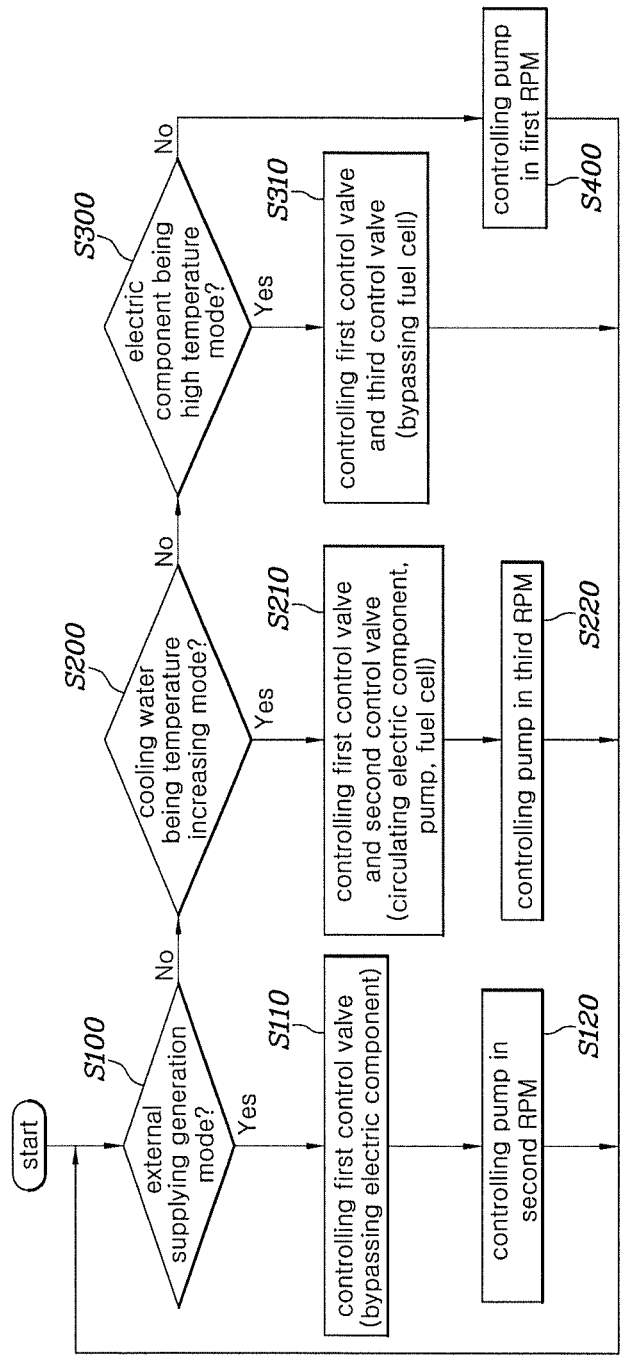

[FIG. 3]
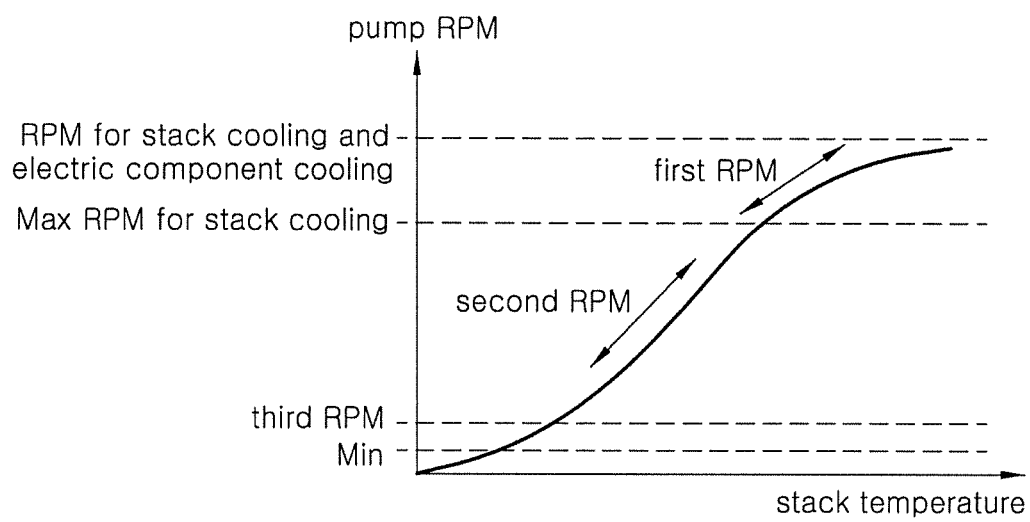
third RPM: value between 10~20% of maximum pump RPM or minimum pump RPM
second RPM: basic control RPM according to stack temperature
first RPM: basic control RPM according to stack temperature + PE loop cooling RPM

COOLING SYSTEM INCLUDING BYPASS FOR ELECTRIC COMPONENT FOR FUEL CELL VEHICLE AND CONTROL METHOD FOR SAME

CROSS REFERENCE TO RELATED APPLICATION

The present application is based on and claims the benefit of priority to Korean Patent Application No. 10-2017-0053323, filed Apr. 26, 2017 with the Korean Intellectual Property Office, the entire contents of which is incorporated herein for all purposes by this reference.

TECHNICAL FIELD

The present disclosure relates generally to a combined cooling system for a fuel cell vehicle and a control method for the same, the system and the method being capable of improving fuel efficiency and cooling performance by providing a combined cooling method for a fuel cell and an electric component in a vehicle.

BACKGROUND

Fuel cells are power generation devices which convert chemical energy of fuel into electric energy within fuel cell stacks by electrochemical reaction instead of converting fuel into heat by burning. The fuel cells may be used as power supplied to homes, industrial facilities, and used for powering vehicles. Particularly, a fuel cell may be used for supplying power to mobile devices.

Among all types of vehicles, fuel cell vehicles generate electric energy by reacting hydrogen and oxygen. The generated electric energy is used for powering vehicles by driving motors thereof. Alternatively, the generated electric energy is connected to an external power supplying network so that the electric energy is used for supplying power to homes or offices, or to other facilities.

When electric energy generated in the fuel cell stacks is used for driving the vehicles, heat generated in the fuel cell stacks while the power is generated in the stacks has to be removed. In addition, heat generated in electric components such as a motor, an inverter, a convertor, etc., and which are used for driving the vehicle, has to be also removed.

In a conventional cooling system for a fuel cell vehicle, a fuel cell (stack) cooling system and an electric component cooling system are configured independently. The fuel cell (stack) cooling system cools down fuel cell stacks by using a cooling pump with a high voltage to circulate a coolant. The electric component cooling system cools down a motor control unit (MCU), a motor, a convertor, etc. by driving a cooling pump with a low voltage.

In addition, since both of the systems are independently configured, respective radiators are configured independently as well. Thus, a remaining space between the radiators cannot be utilized; cooling loops become long; and cooling packages become complex. In addition, since cooling loops are respectively configured, it is not possible to control two systems by mutually interlocking. Thus, two systems are simply controlled by respective sequences thereof.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention is intended to propose a cooling system of a fuel cell vehicle and a control method for the same, whereby the system and the method are capable of improving cooling performance of a fuel cell vehicle, increasing fuel efficiency by improving cooling efficiency, and increasing available power in portable power generation systems.

In order to achieve the above object, according to one aspect of the present disclosure, a cooling system for a fuel cell vehicle includes: a main line connecting a fuel cell, an electric component, a pump, and a radiator of the fuel cell vehicle, the main line through which a coolant circulates; an electric component bypass line branched from an upstream point of the electric component of the main line and joined at a downstream point of the electronic component of the main line based on a circulating direction of the coolant; a first control valve, provided at a branch point of the main line and the electric component bypass line, controlling the coolant to pass through the electric component or to flow to the electric component bypass line; and a controller controlling a vehicle driving generation mode and an external supplying generation mode of the fuel cell, and controlling the first control valve so that the coolant flows to the electric component bypass line and bypasses the electric component when the fuel cell is in the external supplying generation mode.

In one embodiment of the present disclosure, the coolant may circulate in a sequence of the electric component, the pump, the fuel cell, and the radiator within the main line.

In one embodiment of the present disclosure, the electric component bypass line may be branched from a point between the radiator and the electric component of the main line, and joined at a point between the electric component and the pump of the main line.

In one embodiment of the present disclosure, the system may further include: a main bypass line branched from the electric component bypass line at a predetermined point, and joined at a point between the fuel cell and the radiator of the main line; and a second control valve, provided at a branch point of the electric component bypass line and the main bypass line, controlling the coolant to pass through the electric component bypass line or the main bypass line, wherein when the vehicle is in a coolant temperature increasing mode, the controller may control the first control valve and the second control valve so that the coolant is increased in temperature by circulating through the electric component, the pump, and the fuel cell.

In one embodiment of the present disclosure, the system may further include: a fuel cell bypass line branched from the upstream point of the fuel cell of the main line, and joined ay the downstream point of the fuel cell of the main line based on the circulating direction of the coolant; and a third control valve, provided at a branch point of the main line and the fuel cell bypass line, controlling the coolant to pass through the fuel cell or to bypass the fuel cell, wherein when the fuel cell vehicle is in an electric component high temperature mode, the controller may control the third control valve so that the coolant flows to the fuel cell bypass line and bypasses the fuel cell.

In one embodiment of the present disclosure, the system may further include: a main bypass line branched from the electric component bypass line at a predetermined point, and joined t a point between the fuel cell and the radiator of the main line; a second control valve, provided at a branch point of the electric component bypass line and the main bypass line, controlling the coolant to pass through the electric component bypass line or the main bypass line; a fuel cell bypass line branched between the pump and the fuel cell, and joined to the main bypass line at a predetermined point; and a third control valve, provided at a branch point of the upstream point of the fuel cell, controlling the coolant to pass through the fuel cell or to bypass the fuel cell, wherein when the fuel cell vehicle is in a coolant temperature increasing mode, the controller may control the first control valve and the second control valve so that the coolant is increased in temperature by circulating through the electric component, the pump, and the fuel cell, and when the fuel cell vehicle is in an electric component high temperature mode, the controller may control the third control valve so that the coolant flows to the fuel cell bypass line and bypasses the fuel cell.

In one embodiment of the present disclosure, when the fuel cell is in the vehicle driving generation mode, the pump may be set to a first RPM, and when the fuel cell is in the external supplying generation mode, the pump may be set to a second RPM, and the controller may control the first RPM to be greater than the second RPM.

In one embodiment of the present disclosure, when the fuel cell is in the external supplying generation mode, the pump may be set to the second RPM, and when the fuel cell vehicle is in the coolant temperature increasing mode, the pump may be set to a third RPM, and the controller may control the second RPM to be greater than the third RPM.

Meanwhile, in order to achieve the above object, according to another aspect of the present disclosure, there is provided a control method of a cooling system for a fuel cell vehicle, the method including: determining whether the fuel cell is in the vehicle driving generation mode or in the external supplying generation mode; and controlling the first control valve so that the coolant flows to the electric component bypass line and to bypass the electric component when the fuel cell is in the external supplying generation mode.

According to still another aspect of the present disclosure, there is provided a control method of a cooling system for a fuel cell vehicle, the method including: determining whether or not the fuel cell vehicle is in the coolant temperature increasing mode; and controlling the first control valve and the second control valve so that the coolant circulates the electric component, the pump, and the fuel cell when the fuel cell vehicle is in the coolant temperature increasing mode.

According to still another aspect of the present disclosure, there is provided a control method of a control method of a cooling system for a fuel cell vehicle, the method including: determining whether or not the fuel cell vehicle is in the electric component high temperature mode; and controlling the third control valve so that the coolant flows to the fuel cell bypass line and to bypass the fuel cell vehicle is in the electric component high temperature mode.

According to still another aspect of the present disclosure, there is provided a control method of a cooling system for a fuel cell vehicle, the method including: determining whether the fuel cell is in the vehicle driving generation mode or in the external supplying generation mode; controlling the first control valve so that the coolant flows to the electric component bypass line and to bypass the electric component when the fuel cell is in the external supplying generation mode; determining whether or not the fuel cell vehicle is in the coolant temperature increasing mode; controlling the first control valve and the second control valve so that the coolant circulates through the electric component, the pump, and the fuel cell when the fuel cell vehicle is in the coolant temperature increasing mode; determining whether or not the fuel cell vehicle is in the electric component high temperature mode; and controlling the third control valve so that the coolant flows to the fuel cell bypass line and to bypass the fuel cell when the fuel cell vehicle is in the electric component high temperature mode.

According to the cooling system of the fuel cell vehicle and the control method for the same described above, the following effects may be obtained.

First, a stack cooling system and an electric component cooling system are controlled by mutual interlocking, thus cooling performance and fuel efficiency may be improved in various situations such as used for power generation system, cold starting, high temperature ambient environment, etc.

Second, space used for configuring radiators is saved since two radiators are combined. Accordingly, space taken by any one radiator may be utilized.

It will be appreciated by persons skilled in the art that that the effects that could be achieved with the present disclosure are not limited to what has been particularly described hereinabove and other advantages of the present disclosure will be more clearly understood from the following detailed description.

BRIEF DESCRIPTION OF THE DRAWINGS

The above and other objects, features and other advantages of the present disclosure will be more clearly understood from the following detailed description when taken in conjunction with the accompanying drawings, in which:

FIG. 2 is a flowchart showing a control method of the fuel cell cooling system according to an embodiment of the present disclosure; and FIG. 3 is view showing a pump RPM control map of the fuel cell cooling system according to an embodiment of the present disclosure.

DETAILED DESCRIPTION

Figure 1:
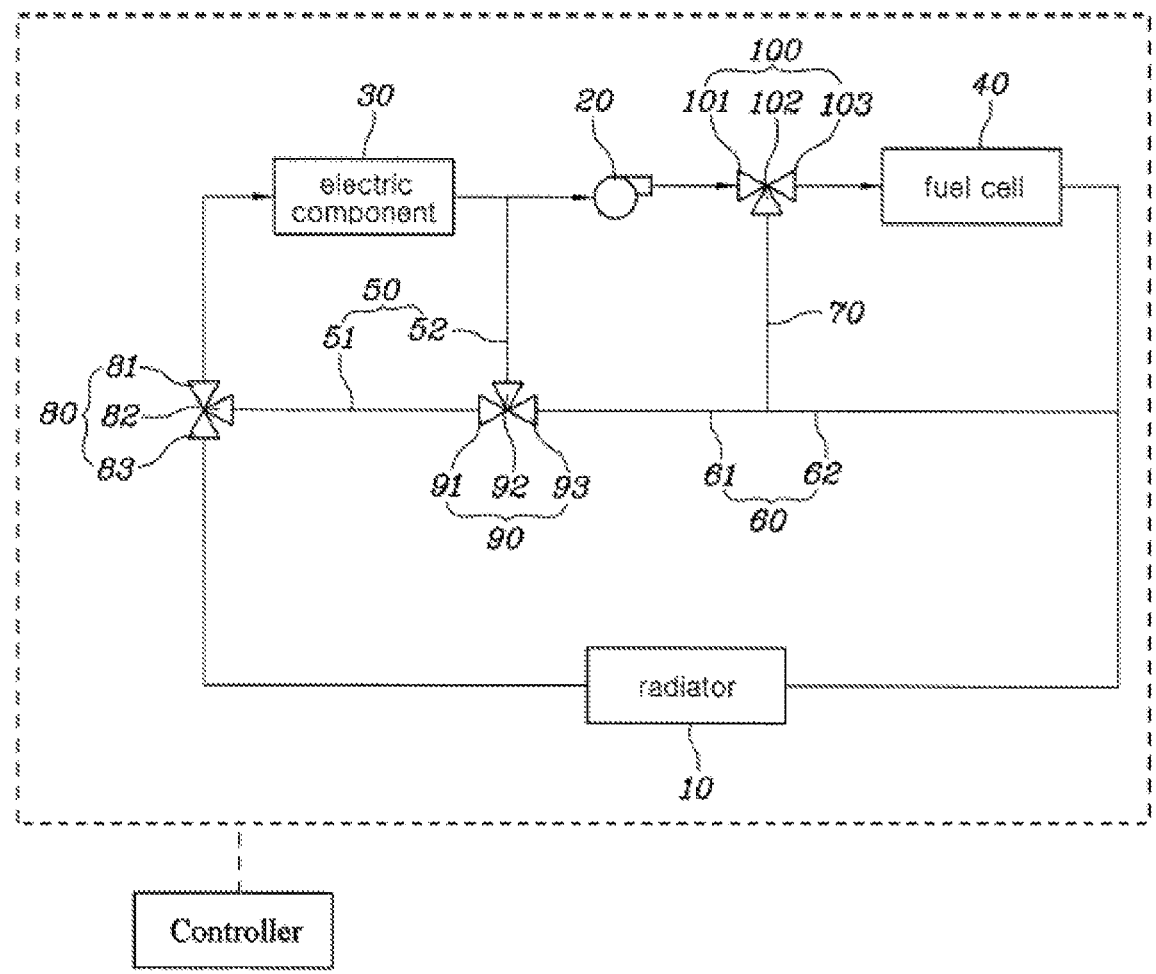
FIG. 1 is a configuration diagram of a fuel cell cooling system according to an embodiment of the present disclosure.

Hereinbelow, exemplary embodiments of the present disclosure will be described in detail with reference to the accompanying drawings. Throughout the drawings, the same reference numerals will refer to the same or like parts.

FIG. 1 is a configuration diagram of a fuel cell cooling system according to an embodiment of the present disclosure.

Referring to FIG. 1, a cooling system for a fuel cell vehicle of the present disclosure includes: a main line connecting a fuel cell 40, an electric component 30, a pump 20, and radiator 10 of a vehicle, and through which coolant circulates; an electric component bypass line 50 branched from an upstream point of the electric component 30 of the main line and joined at a downstream point of the electric component 30 of the main line based on a direction through which the coolant flows; a first control valve 80 provided at a branch point of the main line and the electric component bypass line 50, and controlling the coolant to pass through the electric component 30 or to flow to the electric component bypass line; and a controller (not shown) controlling a vehicle driving generation mode and an external supplying generation mode of the fuel cell 40, and controlling the first control valve 80 so that the coolant flows to the electric component bypass line and bypasses the electric component 30 when the fuel cell 40 is in the external supplying generation mode.

The main line connects the fuel cell 40, the electric component 30, the pump 20, and the radiator 10 of the vehicle so that the coolant circulates therethrough. The electric component 30 may include a motor control unit (MCU), a motor, a converter, etc. The fuel cell 40 refers to a stack used for a power generation.

Particularly, the main line may be configured such that the coolant circulates in a sequence of the electric component 30, the pump 20, the fuel cell 40, and the radiator 10.

The electric component bypass line 50 may be branched from the upstream point of the electric component 30 of the main line, and joined at the downstream point of the electric component 30 of the main line based on the direction through which the coolant flows.

In detail, the electric component bypass line 50 is branched from a point between the radiator 10 and the electric component 30 of the main line, and joined at a point between the electric component 30 and the pump 20 of the main line.

The first control valve 80 may be provided at a branch point of the electric component bypass line 50 and the main line, and control the coolant to pass through the electric component 30 or to flow to the electric component bypass line 50

The controller (not shown) is an electric circuitry that executes instructions of software which thereby performs various functions described hereinafter.

The controller (not shown) controls the vehicle driving generation mode and the external supplying generation mode of the fuel cell 40, and controls the first control valve 80 so that the coolant flows to the electric component bypass line 50 and bypasses the electric component 30 when the fuel cell 40 is in the external supplying generation mode.

In detail, as the first control valve 80, a 3-way valve may be used, when the fuel cell 40 is in the external supplying generation mode, the first control valve 80 may block a valve 81 toward the electric component 30, and control to open a valve 82 toward the electric component bypass line and a valve 83 toward the radiator 10 so that the coolant flows to the electric component bypass line 50 and bypasses the electric component 30.

Accordingly, when the fuel cell 40 is used as an external supplying generator, it is unnecessary to cool down the electric component. The coolant intensively cooling down the fuel cell may circulate when the fuel cell needs to be intensively cooled down. Therefore, a power generation limit of the fuel cell due to cooling limit thereof may be overcome, and power generation performance of the fuel cell may be improved.

A main bypass line 60 may be branched from the electric component bypass line 50 at a predetermined point and joined at a point between the fuel cell 40 and the radiator 10 of the main line.

In addition, a second control valve 90 may be provided at a branch point of the electric component bypass line 50 and the main bypass line 60, and control the coolant to pass through the electric component bypass line 50 or the main bypass line 60.

In detail, the second control valve 90 may control the coolant that flows in the electric component bypass line 51 between the first control valve 80 and the second control valve to pass through the electric component bypass line 52 connected between the second control valve 90 and the electric component 30 and the pump 20, or to pass through the main bypass line 60.

When the vehicle is in a coolant temperature increasing mode in which the coolant has to be increased in temperature for cold starting, the controller (not shown) may control the first control valve 80 and the second control valve 90 so that the coolant is increased in temperature by circulating through the electric component 30, the pump 20, and the fuel cell 40 when the vehicle is in the coolant temperature increasing mode. In detail, as the first control valve 80 and the second control valve 90, a 3-way valve may be used, and the first control valve 80 may block the valve 83 toward the radiator 10 and control to open the valve 82 toward the electric component bypass line 52 and the valve 83 toward the radiator 10. In addition, the first control valve 80 may block a valve 92 toward the electric component bypass line 52 connected between the second control valve 90, and the electric component 30 and the pump 20, and control to open a valve 91 toward the electric component bypass line 51 connected to the first control valve 80, and to open a valve 93 toward the main bypass line 60.

Accordingly, when the coolant is increased in temperature, temperature increasing time required for the same may be reduced by using heat of the fuel cell 40 and the electric component 30. A temperature difference of the coolant is reduced since the pump 20 weakly circulates the coolant. Thus, a phenomenon in which power is limited due to a rapid inflow of coolant having a large temperature difference to the fuel cell 40 may be prevented.

The fuel cell bypass lines 70 and 62 may be branched from the upstream point of the fuel cell 40 of the main line, and joined at the downstream point of the fuel cell 40 of the main line based on the direction through which the coolant flows.

In addition, a third control valve 100 may be provided at a branch point of the main line and the fuel cell bypass lines 70 and 62, and control the coolant to pass through the fuel cell 40 or to bypass the fuel cell 40.

When the vehicle is in an electric component high temperature mode, for example, ambient air is in a high temperature, the controller (not shown) may control the third control valve 100 so that the coolant flows to the fuel cell bypass line and bypasses the fuel cell 40. In detail, as the third control valve 100, a 3-way valve may be used. The third control valve 100 may block a valve 103 toward the fuel cell 40 and control to open a valve 101 toward the pump 20 and a valve 102 toward the fuel cell bypass lines 70 and 62. Herein, the first control valve 80 may block the valve 83 toward electric component bypass line 52 and control to open the valve 83 toward the radiator 10.

In another embodiment, the fuel cell bypass line 70 may be branched at a point between the pump 20 and the fuel cell 40, and joined to the main bypass line 60 at a predetermined point. The third control valve 100 may be provided at a branch point of the upstream point of the fuel cell 40 so that the coolant may pass through the fuel cell 40 or bypass the fuel cell 40. Herein, by a point in which the fuel cell bypass line 70 joins to the main bypass line 60 at a predetermined point, the main bypass line 60 is distinguished as a main bypass line 61 toward the second control valve 90, a fuel cell bypass line 62 toward a point between the fuel cell 40 and the radiator 10.

Herein, when the fuel cell is in the external supplying generation mode, the controller (not shown) may control the first control valve 80 so that the coolant flows to the electric component bypass line and bypasses the electric component 30. When the vehicle is in the coolant temperature increasing mode, the controller (not shown) may control the first control valve 80 and the second control valve 90 so that the coolant is increased in temperature by circulating through the electric component 30, the pump 20, and the fuel cell 40. When the vehicle is in the electric component high temperature mode, the controller (not shown) may control the third control valve 100 so that the coolant flows to the fuel cell bypass line and bypasses the fuel cell 40. Herein, other valves except for the above controlled valves are maintained as a state in which the coolant flows through the main line.

Accordingly, when the electric component is at a high temperature, for example, driving in an outdoor environment at a high temperature, a phenomenon in which power of the fuel cell vehicle is limited or stopped may be prevented by additionally cooling down the electric component.

When the controller (not shown) controls the pump 20, and the fuel cell 40 is in the vehicle driving generation mode, the controller (not shown) sets the pump 20 to a first RPM, and when the fuel cell 40 is in the external supplying generation mode, the controller (not shown) sets the pump 20 to a second RPM, and the controller (not shown) may control first RPM to be greater than the second RPM. This is because when the fuel cell 40 is in the vehicle driving generation mode, the electric component 30 and the fuel cell 40 have to be cooled down, but when the fuel cell 40 is in the external supplying generation mode, only the fuel cell 40 is cooled down.

When the controller (not shown) controls the pump 20, and the fuel cell 40 is in the external supplying generation mode, the controller (not shown) sets the pump 20 to the second RPM, and when the vehicle is in the coolant temperature increasing mode, the controller (not shown) sets the pump 20 to a third RPM, and the controller (not shown) may control the second RPM to be greater than the third RPM. When the vehicle is in the coolant temperature increasing mode, the coolant may not flow to the radiator since it is unnecessary for the coolant to circulate. Herein, an RPM of the pump 20 may be set to be the minimum.

FIG. 2 is a flowchart showing a control method of a fuel cell cooling system according to an embodiment of the present disclosure.

Referring to FIG. 2, the control method of the fuel cell cooling system of the present disclosure may include: determining whether the fuel cell is in a vehicle driving generation mode or in an external supplying generation mode (S100); and controlling the first control valve so that the coolant flows to the electric component bypass line and bypasses the electric component when the fuel cell is in the external supplying generation mode (S110).

In detail, in S100 of determining whether the fuel cell is in the vehicle driving generation mode or in the external supplying generation mode, a sensor that determines whether or not the fuel cell is connected to external power may be used. When the fuel cell is in the vehicle driving generation mode, the coolant may be controlled to circulate through the main line. Alternatively, when the fuel cell is in the external supplying generation mode, step S110 which controls the first control valve so that the coolant flows to the electric component bypass line and bypasses the electric component is performed. In step S110, the first control valve may block a valve toward the electric component, and control the coolant to flow to the electric component bypass line.

In another embodiment, the control method of the cooling system for the fuel cell vehicle may include: determining whether or not the vehicle is in a coolant temperature increasing mode (S200); and controlling the first control valve and the second control valve so that the coolant circulates through the electric component, the pump, and the fuel cell when the vehicle is in the coolant temperature increasing mode (S210).

In detail, in step S200, the determining of the whether or not the vehicle is in the coolant temperature increasing mode may determine whether or not the vehicle is in a coolant cold stating, or may be determined by measuring a temperature of the coolant. When the vehicle is in the coolant temperature increasing mode, step S210 which controls the first control valve and the second control valve so that the coolant circulates through the electric component, the pump, and the fuel cell is performed. In step S210, the first control valve may block the valve toward the radiator, and the second control valve may block the valve toward the pump and the electric component.

In another embodiment, the control method of the cooling system for the fuel cell vehicle may include: determining whether or not the vehicle is in an electric component high temperature mode (S300); and controlling the first control valve and the third control valve so that the coolant flows to the fuel cell bypass line and bypasses the fuel cell when the vehicle is in the electric component high temperature mode (S310).

In detail, in step S300, the determining of the whether or not the vehicle is in the electric component high temperature mode may be determined by measuring an electric component temperature or a coolant temperature. When the vehicle is in the electric component high temperature, step S310 which controls the third control valve so that the coolant flows to the fuel cell bypass line and bypasses the fuel cell is performed. In step S310, the third control valve may control the valve toward the fuel cell.

As shown in FIG. 2, the control method which considers all of whether or not the fuel cell is in an external generation mode, whether or not the vehicle is in a coolant temperature increasing mode, and whether or not the vehicle is in an electric component high temperature mode may include: determining whether the fuel cell is in a vehicle driving generation mode or in an external supplying generation mode (S100); controlling the first control valve so that the coolant flows to the electric component bypass line and bypasses the electric component when the fuel cell is in the external supplying generation mode (S110); determining whether or not the vehicle is in a coolant temperature increasing mode (S200); and controlling the first control valve and the second control valve so that the coolant circulates through the electric component, the pump, and the fuel cell when the vehicle is in the coolant temperature increasing mode (S210); determining whether or not the vehicle is in an electric component high temperature mode (S300); and controlling the first control valve and the third control valve so that the coolant flows to the fuel cell bypass line and bypasses the fuel cell when the vehicle is in the electric component high temperature mode (S310).

FIG. 3 is a pump RPM control map of the fuel cell cooling system according to the embodiment of the present disclosure.

Additionally referring to FIG. 3, when the fuel cell is in the external supplying generation mode and the coolant flows to the electric component bypass line, the coolant bypasses the electric component and the stack is only cooled down, so the pump of the cooling system may be controlled in a second RPM (S120). In other words, according to a stack temperature, the pump may be controlled in an RPM that cools down only the stack.

When the vehicle is in a coolant temperature increasing mode, the radiator is not cooled and the coolant circulates between the electric component and the fuel cell, so the pump of the cooling system may be controlled in a third RPM (S220). In other words, the coolant is controlled to circulate by controlling the pump an RPM closed to the minimum RPM, thus unnecessary power consumption of the pump may be reduced.

When the fuel cell is not in the external supplying generation mode, the vehicle is not in a coolant temperature increasing mode nor is the vehicle in an electric component high temperature mode, thus the coolant has to cool down both electric component and the fuel cell which is a general situation, so the pump is controlled in a first RPM (S400).

Herein, steps of determining whether the fuel cell is in a vehicle driving generation mode or in an external supplying generation mode and controlling the first control valve, determining whether or not the vehicle is in a coolant temperature increasing mode and controlling the first control valve and the second control valve, and determining whether or not the vehicle is in an electric component high temperature mode and controlling the third control valve may be respective and independent. In addition, the steps may not be performed in the above order.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A cooling system for a fuel cell vehicle, the system comprising:
   a main line connecting a fuel cell, an electric component, a pump, and a radiator of the fuel cell vehicle, the main line through which a coolant circulates;
   an electric component bypass line branched from an upstream point of the electric component of the main line and joined at a downstream point of the electric component of the main line based on a circulating direction of the coolant;
   a first control valve for controlling the coolant to pass through the electric component or to flow to the electric component bypass line; and
   a controller controlling a vehicle driving generation mode and an external supplying generation mode of the fuel cell, and controlling the first control valve,
   wherein the first control valve is arranged at a branch point of the main line and the electric component bypass line such that the first control valve causes the coolant to flow to the electric component bypass line and to bypass the electric component in the external supplying generation mode.

2. The system of claim 1, wherein the pump is set to a first RPM in the external supplying generation mode and is set to a second RPM in a coolant temperature increasing mode, such that the first RPM is greater than the second RPM.

3. The system of claim 1, further comprising:
   a fuel cell bypass line branched from an upstream point of the fuel cell of the main line, and joined in a downstream point of the fuel cell of the main line based on the circulating direction of the coolant; and
   a third control valve for controlling the coolant to pass through the fuel cell or to bypass the fuel cell,
   wherein the third control valve is arranged at a branch point of the main line and the fuel cell bypass line such that the third control valve causes the coolant to flow to the fuel cell bypass line and to bypass the fuel cell, when an electric component temperature is higher than a coolant temperature or an ambient air temperature.

4. The system of claim 1, wherein the coolant circulates in a sequence of the electric component, the pump, the fuel cell, and the radiator within the main line.

5. The system of claim 4, wherein the electric component bypass line is branched from a point between the radiator and the electric component of the main line, and joined at a point between the electric component and the pump of the main line.

6. The system of claim 5, further comprising:
   a main bypass line branched from the electric component bypass line at a predetermined point, and joined to a point between the fuel cell and the radiator of the main line;
   a second control valve for controlling the coolant to pass through the electric component bypass line or the main bypass line;
   a fuel cell bypass line branched between the pump and the fuel cell, and joined to the main bypass line at another predetermined point; and
   a third control valve for controlling the coolant to pass through the fuel cell or to bypass the fuel cell,
   wherein the second control valve is arranged at a branch point of the electric component bypass line and the main bypass line such that the first control valve and the second control valve cause a coolant temperature to increase by circulating through the electric component, the pump, and the fuel cell, and
   wherein the third control valve is arranged at a branch point of an upstream point of the fuel cell such that the third control valve causes the coolant to flow to the fuel cell bypass line and to bypass the fuel cell, when an electric component temperature is higher than the coolant temperature or an ambient air temperature.

7. The system of claim 5, further comprising:
   a main bypass line branched from the electric component bypass line at a predetermined point, and joined at a point between the fuel cell and the radiator of the main line; and
   a second control valve for controlling the coolant to pass through the electric component bypass line or the main bypass line,
   wherein the second control valve is arranged at a branch point of the electric component bypass line and the main bypass line such that the first control valve and the second control valve cause a coolant temperature to increase by circulating through the electric component, the pump, and the fuel cell in a coolant temperature increasing mode.

8. The system of claim 7, wherein the pump is set to a second RPM in the external supplying generation mode and is set to a third RPM in the coolant temperature increasing mode, such that the second RPM is greater than the third RPM.

9. A control method of a cooling system for a fuel cell vehicle, wherein the control method uses a cooling system for a fuel cell vehicle of claim 1, the method comprising:
   determining whether the fuel cell is in the vehicle driving generation mode or in the external supplying generation mode; and
   controlling the first control valve so that the coolant flows to the electric component bypass line and to bypass the electric component in the external supplying generation mode.

10. A control method of a cooling system for a fuel cell vehicle, wherein the control method uses a cooling system for a fuel cell vehicle of claim 3, the method comprising:
- determining whether or not the electric component temperature is higher than the coolant temperature or the ambient air temperature; and
- controlling the third control valve so that the coolant flows to the fuel cell bypass line and to bypass the fuel cell on determining the electric component temperature is higher than the coolant temperature or the ambient air temperature.

11. A control method of a cooling system for a fuel cell vehicle, wherein the control method uses a cooling system for a fuel cell vehicle of claim 6, the method comprising:
- determining whether the fuel cell is in the vehicle driving generation mode or in the external supplying generation mode;
- controlling the first control valve so that the coolant flows to the electric component bypass line and to bypass the electric component in the external supplying generation mode;
- determining whether or not the fuel cell vehicle is in the coolant temperature increasing mode;
- controlling the first control valve and the second control valve so that the coolant circulates through the electric component, the pump, and the fuel cell in the coolant temperature increasing mode;
- determining whether or not the electric component temperature is higher than the coolant temperature or the ambient air temperature; and
- controlling the third control valve so that the coolant flows to the fuel cell bypass line and to bypass the fuel cell on determining the electric component temperature is higher than the coolant temperature or the ambient air temperature.

12. A control method of a cooling system for a fuel cell vehicle, wherein the control method uses a cooling system for a fuel cell vehicle of claim 7, the method comprising:
- determining whether or not the fuel cell vehicle is in the coolant temperature increasing mode; and
- controlling the first control valve and the second control valve so that the coolant circulates the electric component, the pump, and the fuel cell in the coolant temperature increasing mode.

* * * * *